Aug. 11, 1931.   C. JORIOT   1,818,853
MICROMETER CALIPERS
Filed Oct. 11, 1929
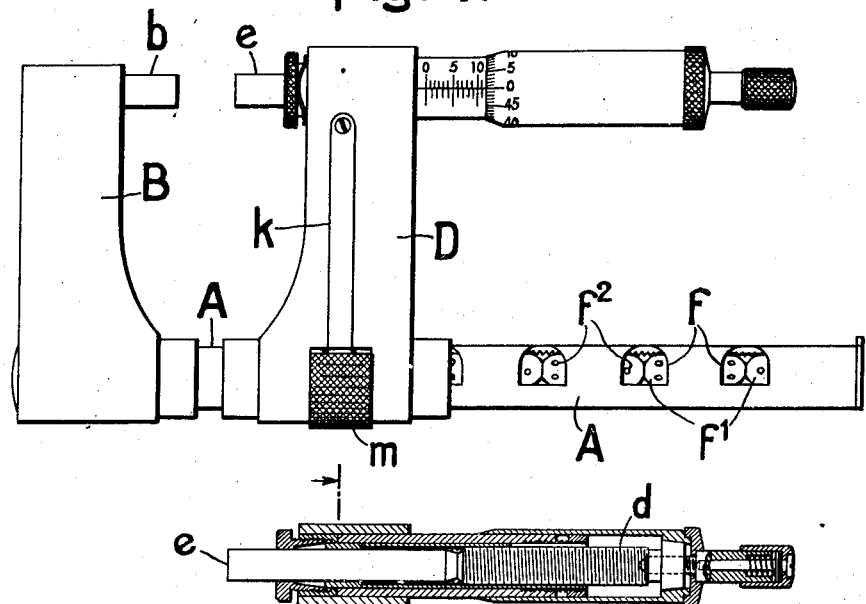
Fig. 1.
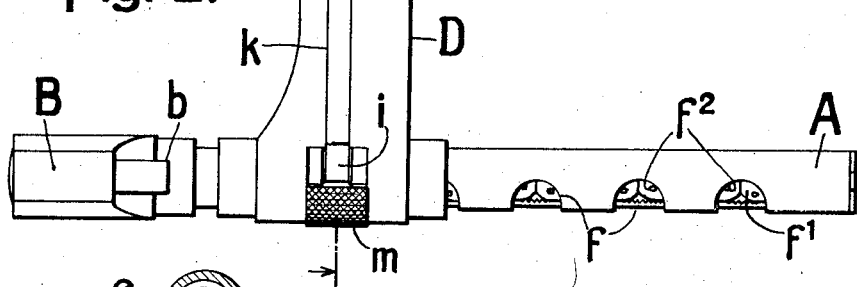
Fig. 2.
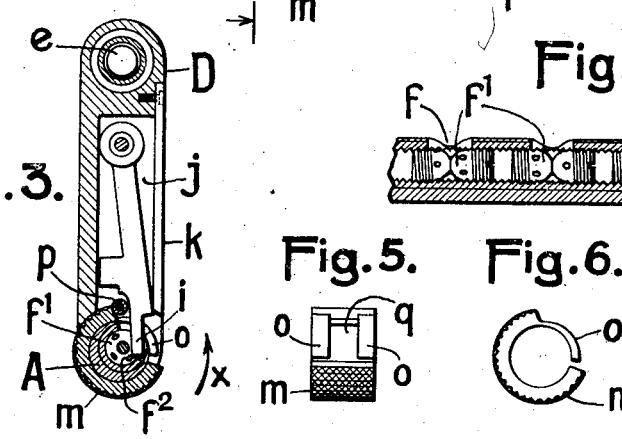
Fig. 3.   Fig. 4.
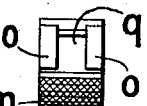 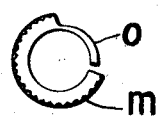
Fig. 5.   Fig. 6.
Inventor:—
Camille Joriot
by
Langner, Parry, Card & Langner
Attys.

Patented Aug. 11, 1931

1,818,853

UNITED STATES PATENT OFFICE

CAMILLE JORIOT, OF LAC-OU-VILLERS, FRANCE

MICROMETER CALIPERS

Application filed October 11, 1929, Serial No. 399,048, and in Switzerland October 15, 1928.

This invention relates to micrometer calipers employing a micrometric screw for measurement, the tool comprising two measuring heads upon one of which the micrometer screw is mounted.

Existing instruments of this kind are not adapted to measure over a wide range and it is usual to employ a series of instruments covering successive narrow ranges of measurement. It would be possible to extend the micrometer screw but to do so would result in diminished accuracy of measurement besides making measurement very tedious.

According to the present invention a micrometer caliper is adapted for a wide range of measurement without increase in the length of the micrometer thread. For this purpose one of its heads, preferably that carrying the micrometer screw, is movable upon the beam of the caliper and so arranged that it can be set in different determined positions spaced apart upon the beam by a combined angular and sliding movement, means being provided to lock it in the desired position when it has been rocked into exact alignment with the fixed head.

The accompanying drawings show by way of example a construction of the invention, Figure 1 being an elevation, Figure 2 a plan with the movable head rocked out of position and shown partly in section, Figure 3 a transverse section of the movable head, while Figures 4, 5 and 6 show details.

The beam of the caliper is indicated by A; it carries at one end the fixed head B with a feeler $b$ and slidable on its body the movable head D with a micrometer screw $d$ serving in well known manner to adjust the feeler $e$. The beam A is hollow and of circular cross section. It has in it a series of lateral slots or recesses $f$ spaced at equal distances. In each of these slots or recesses are two coned set screws $f^1$ screwing into the tapped bore of the beam (Figure 4), their smaller ends being adjacent. These screws $f^1$ can be adjusted with precision in the slots $f$ and provide a seat for setting and clamping the movable head D. For the purpose of adjustment they have holes $f^2$ in them to receive a tommy bar.

The movable head D, which in its normal position is aligned exactly with the fixed head B can be shifted along the beam A by a combined angular and longitudinal sliding movement. By this means it can be shifted from one to another of the several measuring or gauging positions defined by the slots $f$ and the coned gauge screws $f^1$ within them. It can be fixed in any of these positions by means of a setting finger $i$ (Figure 3) hinged in a recess $j$ in the head, which under the pressure of a leaf spring $k$ tends to engage the rounded surface of its end between the coned ends of the set screws $f^1$. A milled sleeve $m$ (shown separately in Figures 5 and 6) serves to lock the head D in position. This sleeve $m$ is recessed on its periphery to form an eccentric cam surface $o$ (Figure 6). It can turn friction tight upon the beam A.

When the finger $i$ is contacting with the coned screws $f^1$, the head D can be locked by turning the sleeve $m$ in the direction shown by the arrow $x$ so that the highest part of the cam is jammed against a projection $p$ (Figure 3) upon the head D and the head is thereby fixed upon the beam A. The cam surface $o$ of the sleeve $m$ is slotted at $q$ to permit the passage of finger $i$, the slot extending far enough to permit the required rotation of the sleeve.

In each gauge position of the movable head D measurement is effected in the ordinary way by the use of the micrometer screw $d$. When it is desired to shift the movable head to another slot $f$ of the beam A, that is to say to another position, the head is unclamped by turning back the sleeve $m$, then the head is turned sufficiently to cause the finger $i$ to be lifted from between the coned set screws $f^1$ and to pass upon the unrecessed surface of the beam A. The head D can then be slid along the beam to the new gauge position desired and turned back into alignment with the fixed head, the position of alignment being determined by the abutment of the free end of the finger $i$ upon the flat side of the corresponding slot $f$. The finger $i$ is thus engaged between the coned screws $f^1$ in this slot and the head has only to be clamped in position by turning the sleeve $m$ as already explained.

It will be seen that the movable head D can thus be brought to any one of several gauge positions upon the beam A and thus the range of measurement of the instrument is very greatly increased, although the micrometer screw is of the ordinary length. Exact setting of the movable head in each gauge position is secured by means of the coned screws $f^1$ which determine exactly the position of engagement of the finger $i$ and therefore the position in which the movable head is clamped.

What I claim is:

1. A wide range micrometer caliper comprising a beam having spaced lateral recesses, two measuring heads thereon, one of which is slidable and turnable on said beam, a micrometer screw carried by one of said heads, adjustable seat members within said recesses of the beam to determine the exact positions for the movable head, a connector on the latter to selectively engage the seat members in said recesses for setting purposes, and clamping means for clamping the movable head when it is adjusted by sliding movement to the desired measuring position and brought by turning into alignment with the other head.

2. A wide range micrometer caliper comprising a beam having spaced lateral recesses, two measuring heads thereon, one of which is slidable and turnable on said beam, a micrometer screw carried by one of said heads, a plurality of pairs of opposed adjustable conical screws arranged to form seats within said recesses of the beam to determine the exact positions for the movable head, a connector on the latter to selectively engage said seats for setting purposes, and clamping means for clamping the movable head when it is adjusted by sliding movement to the desired measuring position and brought by turning into alignment with the other head.

3. A wide range micrometer caliper comprising a beam having spaced lateral recesses, two measuring heads thereon, one of which is slidable and turnable on said beam, a micrometer screw carried by one of said heads, a plurality of pairs of opposed adjustable conical screws arranged to form seats within said recesses of the beam to determine the exact positions for the movable head, a connecting finger hinged on the latter to selectively engage said seats for setting purposes, and clamping means for clamping the movable head when it is adjusted by sliding movement to the desired measuring position and brought by turning into alignment with the other head.

4. A wide range micrometer caliper comprising a beam having spaced lateral recesses, two measuring heads thereon, one of which is slidable and turnable on said beam, a micrometer screw carried by one of said heads, a plurality of pairs of opposed adjustable conical screws arranged to form seats within said recesses of the beam to determine the exact positions for the movable head, a connector on the latter to selectively engage said seats for setting purposes, and a rotatable sleeve on the beam for clamping the movable head when set in position, said sleeve having an eccentric cam part and being arranged to cooperate with a part of said movable head for producing clamping thereof on the beam.

In witness whereof I have hereunto signed my name this 2nd day of October, 1929.

CAMILLE JORIOT.